United States Patent [19]
Peelman

[11] 3,943,362
[45] Mar. 9, 1976

[54] SIMULTANEOUS OXYGEN AND SILICON NEUTRON ACTIVATION WELL LOG USING PULSED NEUTRON SOURCE

[75] Inventor: Harold E. Peelman, Houston, Tex.

[73] Assignee: Texaco Inc., New York, N.Y.

[22] Filed: Jan. 18, 1974

[21] Appl. No.: 435,133

[52] U.S. Cl. .............. 250/256; 250/262; 250/270; 250/303
[51] Int. Cl.² .......................................... G01V 5/00
[58] Field of Search .......... 250/256, 262, 263, 264, 250/270, 266, 303

[56] References Cited
UNITED STATES PATENTS

| | | | |
|---|---|---|---|
| 2,963,586 | 12/1960 | Rickard | 250/270 |
| 3,120,612 | 2/1964 | Youmans | 250/270 |
| 3,139,528 | 6/1964 | Johnson | 250/270 |
| 3,184,598 | 5/1965 | Tittle | 250/270 |
| 3,257,557 | 6/1966 | Youmans | 250/270 |
| 3,465,151 | 9/1969 | Youmans | 250/270 |
| 3,780,303 | 12/1973 | Smith et al. | 250/270 |
| 3,796,877 | 3/1974 | Smith | 250/270 |
| 3,801,816 | 4/1974 | Arnold | 250/270 |

Primary Examiner—Harold A. Dixon
Attorney, Agent, or Firm—T. H. Whaley; C. G. Ries; William J. Beard

[57] ABSTRACT

Disclosed is a well logging system for performing a continuous log of the oxygen and silicon content of earth formations in the vicinity of a well bore. A downhole sonde housing a pulsed source of 14 mev neutrons is used to irradiate earth formations in the vicinity of the well bore. A NaI (T1) detector spaced approximately 25⅝ inches from the source detects gamma rays caused by neutron activation of elemental oxygen and silicon in the formations and produces voltage pulses representative of the elemental oxygen and silicon. The voltage pulses are transmitted to the surface where they are separated, corrected for background radiation and plotted continuously as a function of bore hole depth. The resultant well log traces may be interpreted in terms of lithology or formation water saturation by the use of disclosed techniques.

14 Claims, 6 Drawing Figures

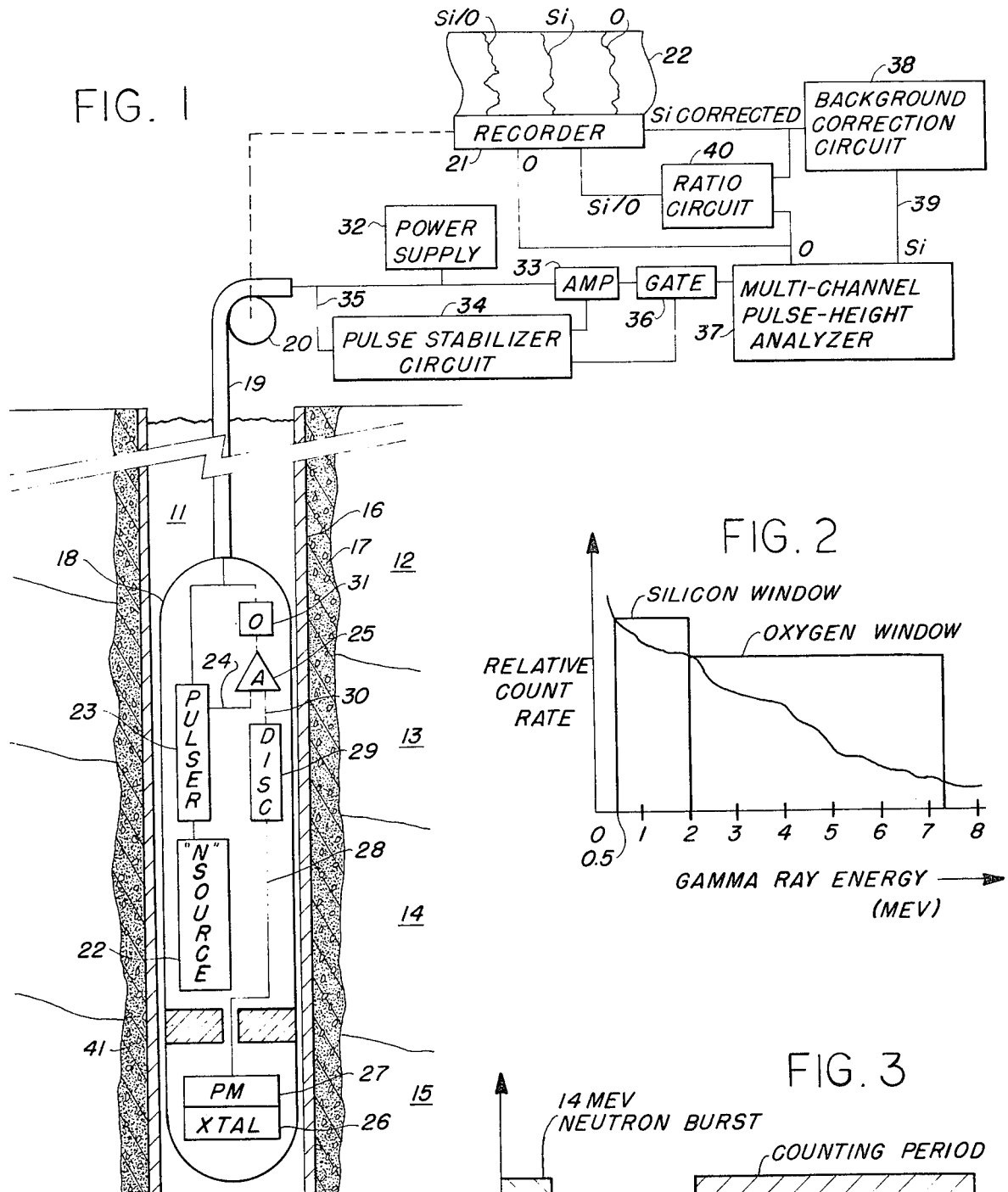

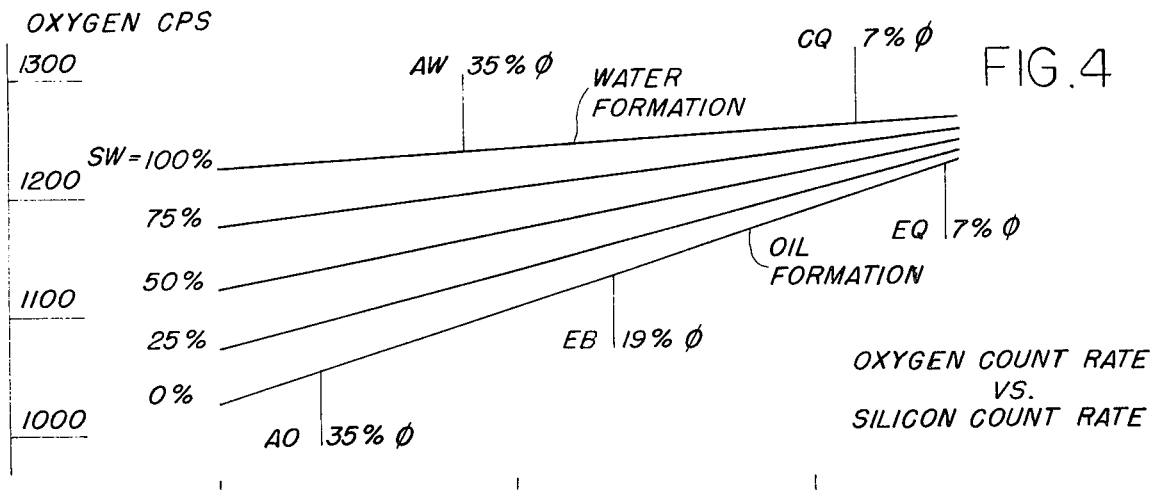
FIG. 4 OXYGEN COUNT RATE VS. SILICON COUNT RATE
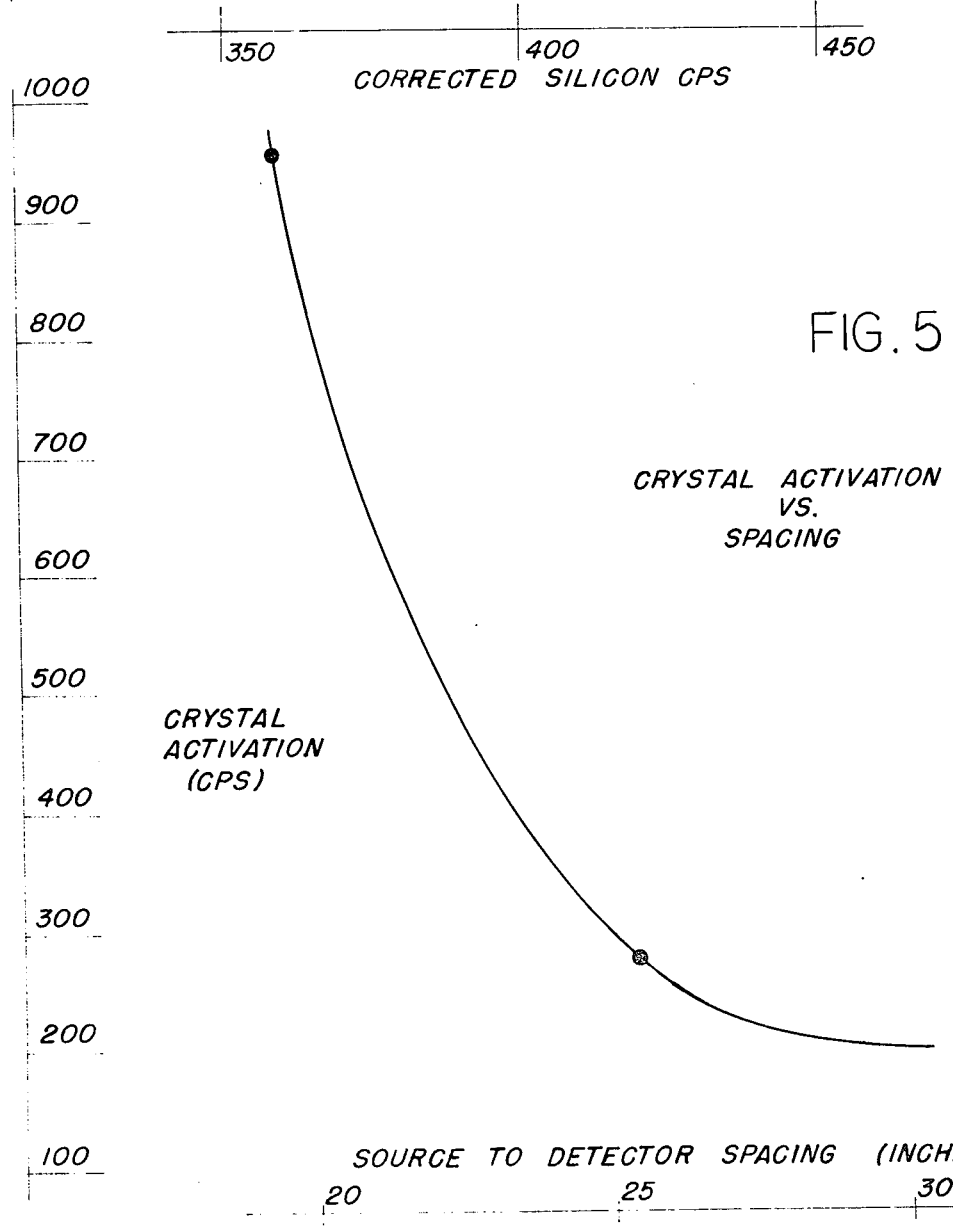
FIG. 5 CRYSTAL ACTIVATION VS. SPACING

RELATIVE CPS
SILICON ACTIVATION

RELATIVE CPS
OXYGEN ACTIVATION

SIMULTANEOUS OXYGEN AND SILICON NEUTRON ACTIVATION WELL LOG USING PULSED NEUTRON SOURCE

BACKGROUND OF THE INVENTION

1. Field of the Invention

The present invention relates to well logging and more particularly to neutron activation well logging for the determination, in a direct manner, of oil sands from water sands.

2. Description of Prior Art

With the advent of pulsed neutron well logging, it has become common practice in well workovers to log cased well bores with some type of pulsed neutron log in order to determine the water saturation and hydrocarbon content of sands disposed externally of the casing in a cased well bore. While the neutron lifetime well log using a pulsed neutron source had proven to be an accurate and reliable indicator of sands containing salt waters in the pore spaces between the sand grains, it often occurs in various areas of the world in which petroleum is being produced that the hydrocarbon located in the pore spaces of the sands is associated with fresh water rather than with salt water. Since the neutron lifetime (or thermal neutron decay time) well log is heavily dependent upon the chlorine content of the fluid filling the pore spaces in the earth formation surrounding the borehole, the log is ambigious in cases in which such spaces are filled with a fresh water and oil mixture rather than a salt water and oil mixture. In these cases, it is desirable to employ some other type well log which can distinguish the fluids in the pore spaces of the earth formation wherein fresh water is contained in the pore spaces rather than salt water or hydrocarbons.

It has been proposed in the prior art to perform neutron activation well logs based on the neutron activation of the element oxygen which is contained in the earth formations surrounding the well bore hole. The prior art has also proposed performing neutron activation well logs based on the neutron activation of the element silicon which is also contained in earth formations surrounding a well bore hole. In these prior art proposals however, it has never been proposed to simultaneously make a determination of the oxygen and silicon content of earth formations surrounding the well bore using neutron activation well logging techniques. Typically, in the prior art proposals for neutron activation well logging, it has been proposed to irradiate earth formations surrounding the well bore hole with neutrons and to utilize and extremely far spaced detector (from the neutron source) to detect gamma rays due to the decay of the unstable radioactive isotope aluminum 28 which is produced by the neutron activation of silicon in earth formations surrounding a bore hole. Because aluminum 28 has a relatively long decay half life, 2.3 minutes the gamma ray detector to neutron source spacing proposed in prior art suggestions for this type of well logging as been extremely long.

Similarly, prior art proposals of oxygen activation logging of earth formations in the vicinity of a well bore hole generally have provided for means for irradiating the earth formation surrounding the bore hole with high energy (or fast) neutrons of sufficient energy to provide the transmutation of the oxygen 16 nucleus to the unstable radioactive nucleus nitrogen 16. By then monitoring the 6.13 mev gamma ray emitted by the decay of nitrogen 16 to a stable isotope the oxygen content of earth formations can be measured. The radioactive half life of this nuclear reaction is 7.3 seconds which is very short compared with the 2.3 minute radioactive half life associated with the decay of aluminum 28. For this reason it has generally been considered incompatible in the prior art to perform a simultaneous log of both the silicon and oxygen components of earth formation in the vicinity of the well bore hole.

Accordingly, it is an object of the present invention to provide method and apparatus for performing neutron activation well logging in a simultaneous manner of both the oxygen and silion components of earth formations surrounding a well bore hole.

It is another object of the present invention to provide a simultaneous oxygen and silicon neutron activation well log utilizing a single high energy neutron source and a single detector to perform the simultaneous well log.

A still further object of the present invention is to provide a simultaneous silicon and oxygen neutron activation well log which can be interpreted as a direct indicator of hydrocarbon in the earth formation surrounding a well bore hole.

BRIEF DESCRIPTION OF THE INVENTION

A simultaneous determination of the relative content of the earth formation surrounding a well bore hole of the elements silicon and oxygen is provided in the present invention by a well logging method and apparatus comprising a downhole fluid tight well logging housing or sonde member which contains a pulsed source of high energy (14 mev) neutrons from a deuterium-tritium type neutron accelerator. The well logging sonde also contains a sodium iodide thallium (Tl) activated crystal detector of gamma rays which is optically coupled to a photomultiplier tube and which furnishes electrical pulse signals representative of gamma rays detected in the vicinity of the detector in the well bore hole from elements which are activated by the neutron bombardment of the pulsed neutron source. Voltage pulses whose height is proportional to the energy of the gamma rays impinging upon the crystal detector are sent to the surface from the downhole sonde. Reference voltage pulses of known amplitude are also provided for stabilizing the gain of the electronic circuitry in the system to provide a linear measurement of the height of the representative gamma ray pulses. Pulse height stabilization signals and synchronization signals are also provided to the surface equipment from the downhole sonde.

At the surface, the gamma ray voltage pulse signals are time gated relative to the activation of the neutron source and supplied to a multichannel pulse height analyzer which separates gamma rays produced by the decay of the unstable radioactive isotope nitrogen 16 and those produced by the decay of the unstable radioactive isotope aluminum 28. The oxygen induced activation gamma ray signals are supplied to a well logging recorder which is moved as a function of the depth in the bore hole in the downhole sonde and also to a ratio circuit. The aluminum 28 (silicon) produced gamma ray signals are supplied to a background correction circuit and thence to the well logging recorder and the ratio circuit. The ratio circuit is used to form the ratio of the silicon to oxygen content of the earth formations in the vicinity of the downhole sonde which is also recorded as a function of depth. The corrected silicon gamma ray count signals are also recorded as a function of bore hole depth by appropriate interpretative techniques. The recorded signals may then be interpreted in terms of the content of the pore spaces of the fluid content of the pore spaces of the media surrounding the well bore hole in the vicinity of the downhole sonde.

The invention is pointed out with particularity in the appended claims. The present invention is best understood by reference to the following detailed description thereof when taken in conjunction with the accompanying drawings in which:

BRIEF DESCRIPTION OF THE DRAWINGS

FIG. 1 is a schematic block diagram illustrating the well logging apparatus of the present invention;

FIG. 2 is a schematic illustration of a typical neutron activation gamma ray spectrum and illustrating the relative location of energy windows used to discriminate silicon activation gamma rays from oxygen activation gamma rays in the present invention;

FIG. 3 is a timing diagram illustrating the neutron burst width and the relative counter activation period subsequent thereto for detecting neutron activation gamma rays from the detector;

FIG. 4 is a graphical representation showing the relative counts in the oxygen window and in the silicon window (corrected for background) using the well logging system according to the present invention;

FIG. 5 is a graphical illustration showing the amount of background radiation produced by detector crystal activation as a function of the neutron source to gamma ray detector spacing in the present invention.

DESCRIPTION OF THE PREFERRED EMBODIMENT

Figure 6:
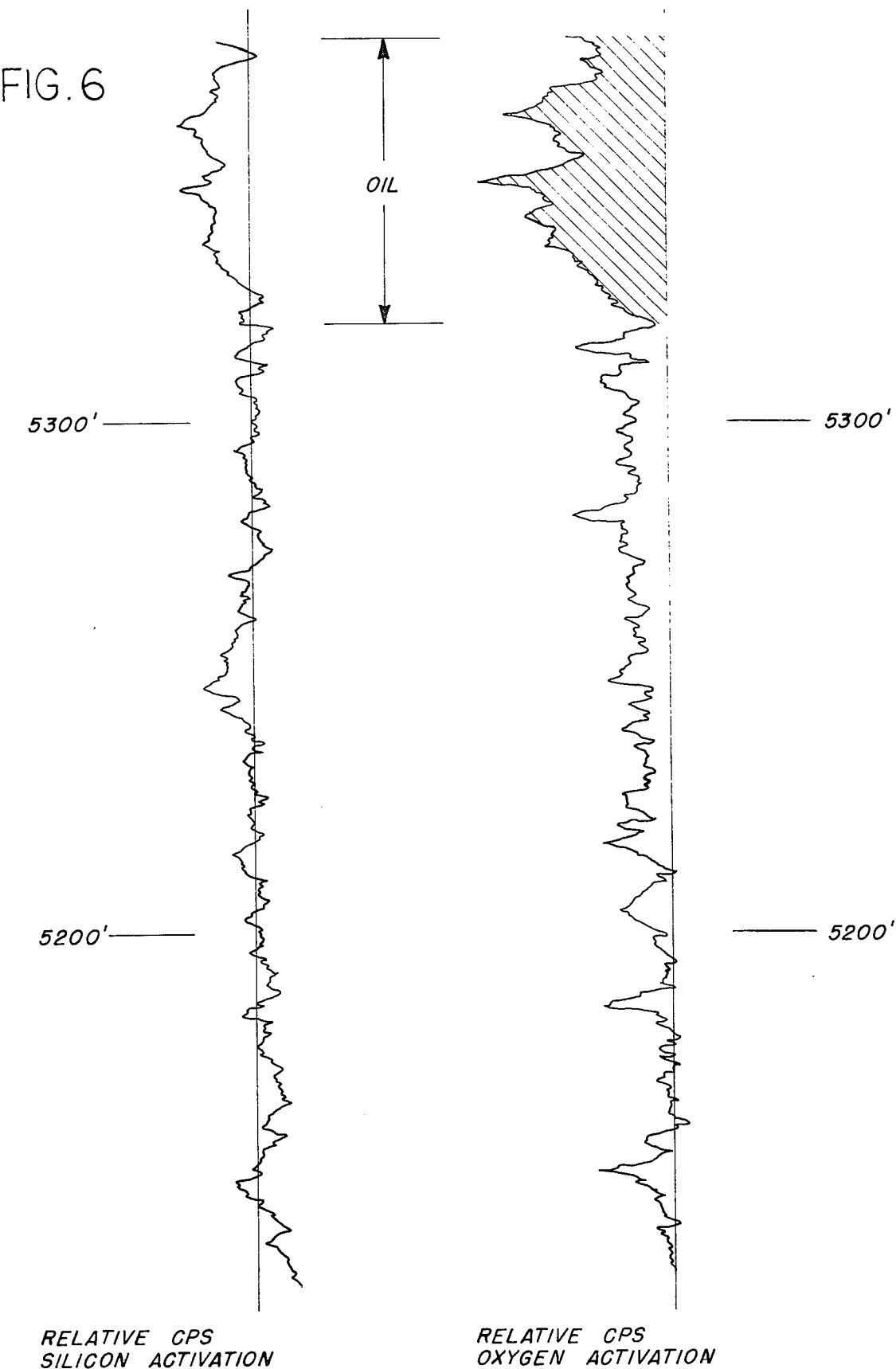
FIG. 6 is a diagramatic representation of a well log in accordance with the concepts of the invention illustrating the usefulness of the measurement of the well logging system of the invention.

It has been proposed in the prior art to perform both oxygen and silicon activation logs of earth formations by bombarding the earth formations surrounding a well bore hole with high energy neutrons. However, due to discrepancies in the manner of measurement of these two different nuclear reactions it has not been proposed previously to simultaneously make these determinations. Oxygen and silicon activation logs are useful in measuring the relative oxygen and silicon concentrations in elemental form in the earth formations and formation fluids surrounding a well bore hole through which a well logging sonde is moving. A sand formation containing fresh water has more elemental oxygen content than a sand formation containing hydrocarbon. Therefore a decrease in oxygen counting rate in such a zone would be an indication that the zone could be of possible interest for producing hydrocarbon. If the sand containing fresh water and the sand containing hydrocarbon had the same porosity there would be no change in the relative elemental silicon activation gamma ray counting rate in this zone.

In performing an oxygen activation well log by bombarding earth formations surrounding a bore hole with neutrons it is mandatory that the neutron cloud provided for the bombardment contain neutrons of sufficiently high energy to cause the reaction to take place.

The particular reaction of interest for the oxygen activation well logging is the $O^{16}(N,P)N^{16}$ reaction. This reaction can be measured by monitoring the 6.13 mev gamma ray emitted when the radioactive isotope nitrogen 16 decays to a stable isotope. The half life of this reaction is about 7.3 seconds. The reaction of interest for silicon activation logging is the $Si^{28}(N,P)Al^{28}$ reaction. This reaction can be measured by monitoring the 1.78 mev gamma ray produced by the decay of the radioactive isotope aluminum 28. The half life of this reaction is approximately 2.3 minutes.

Referring initially to FIG. 1 a well logging system suitable for performing a simultaneous silicon and oxygen activation well log is illustrated schematically. A fluid filled well bore hole 11 is shown penetrating earth formations 12, 13, 14 and 15 whose characteristics are desired to be measured. The bore hole 11 is surrounded by a steel casing 16 which is cemented in place by a cement layer or annulus 17. A downhole fluidtight body member or sonde 18 is shown suspended in the bore hole 11 by an armored well logging cable 19 which is connected to surface equipment which will be described in more detail subsequently.

The well logging cable 19, which may be of conventional multi-conductor design or can be an armored coaxial single conductor cable if desired, passes over a sheave wheel 20 which rotates as the cable is drawn across it. The sheave wheel 20 is either electrically or mechanically coupled in a manner well known in the art to a conventional well logging recorder 21 which plots quantities of interest on a record medium 22 as a function of the depth in the borehole 11 of the well logging sonde 18. Thus a continuous recording of the measured quantities of interest is provided by the system of the present invention.

The downhole sonde 18 is provided on the interior portion thereof with a pulsed neutron source 22 of the deuterium-tritium accelerator type. A pulser 23 provides electrical control signals to the neutron source 22 for its operation. Circuitry of conventional design in the art (not shown) accepts the signal from the pulser 23 and causes the neutron source 22 to be activated for a predetermined period of time beginning with the receipt of the signal from the pulser 23. The pulser 23 also provides, via line 24, a stabilized amplitude control pulse to an amplifier circuit 25 within the sonde or housing 18. At the surface this pulse is used for synchronizing the operation of the surface equipment with the downhole tool and for controlling the gain of the amplification equipment in the system in order to provide linear measurements.

The downhole sonde 18 is also provided with a NaT(Tl) radiation detector 26. Optically coupled to the sodium iodide thalium activated crystal 26 is a conventional photomultipler tube 27. As is well known in the art, when a gamma ray penetrates the detector crystal 26 it causes disruption of the crystal lattice structure therein and causes a flash of light in the transparent detector crystal whose intensity is proportional to the energy of the gamma ray creating the disturbance. The photomultiplier tube 27 and its associated circuitry converts these light flashes into voltage pulses having an amplitude functionally related to the intensity of the light flashes and hence functionally related to the energy of the gamma ray entering the detector crystal 26.

The pulse signals from the photomultiplier tube 27 are conducted via line 28 to a discriminator circuit 29 which is used to discriminate against low energy background gamma radiation which may be present from naturally occurring radioactive sources in the vicinity of the bore hole. In the practice of the present invention, for example, it has been found desirable to set the level of the discriminator 29 at a level adequate to prevent voltage pulses representative of gamma rays having an energy less than 0.5 mev from entering the cable transmission system for transmission to the surface. Output signals from the discriminator 29 are supplied via line 30 to the amplifier 25, for linear amplification prior to transmission to the surface. The output of amplifier 25 is provided to the cable driving amplifier 31 which amplifies the signals to a level suitable for transmission to the surface in a linear manner and which couples the count pulse signals appropriately to a cable 19 conductor for this transmission.

Power for the operation of the circuit elements in the downhole sonde is provided along conductors of the cable 19 which may be a conventional multi-conductor well logging cable or the armored coaxial type if desired. In any event, power from the surface power supply 32 is supplied over the cable 19 conductors to the downhole sonde 18 and converted therein by power supplies (not shown) of a conventional type to the voltage levels required to operate the circuitry within the downhole portion of the system.

At the surface the voltage pulses representative of the gamma rays detected in the detector crystal 26 in the downhole sonde 18 and the stabilization and synchronization pulses provided by the pulser 23 are routed to an amplifier circuit 33 whose gain is controlled by a pulse stabilizer circuit 34. The signals are also supplied to the pulse stabilizer circuit 34 directly via line 35. The pulse stabilizer circuit 34 which may be of the type shown in U.S. Pat. No. 3,767,921 which is assigned to the assignee of the present invention if desired, functions to provide output control signals which control the gain of the amplifier 33 to provide a linear amplification of the pulse count signals from the downhole detector 26. Thus amplifier 33 functions as a gain control linear amplifier whose gain is always held at such a value by the pulse stabilizer circuit 34 so as to assure that the amplitude of the representative gamma ray voltage count pulses from the downhole equipment is maintained at a constant input level to the remaining circuitry.

The pulse stabilizer circuit 34 also provides output control pulses to a time gating circuit 36. The time gate circuit 36 admits count pulses from the downhole equipment which have been amplified by the amplifier 33 to the succeeding circuitry only upon receipt of a conditioning signal from the pulse stabilizer circuit 34. These signals are provided at a predetermined time following the receipt of a voltage pulse stabilization signal from the downhole equipment by the pulse stabilization circuit 34. Thus the operation of the surface equipment is synchronized with the operation of the downhole neutron generator 22.

Referring now to FIG. 3 the relative timing of the system is illustrated schematically. It has been found preferable in the present invention to have the downhole pulser 23 provide control signals to the downhole neutron source 22 at a rate of approximately 100 pulses per second. These pulses are then used to activate the neutron generator 22 to produce a burst of fast neutrons having a time duration of approximately 1 millisecond as illustrated in FIG. 3. This also provides approximately a 9 millisecond time interval between bursts from the downhole neutron generator 22. In order to allow thermal neutron stabilization following the neutron burst and to allow gamma radiation resulting from the capture of thermal neutrons by the elements in the material surrounding the bore hole to substantially die out and leave substantially only gamma rays resulting from the activation of relatively long lived radioactive isotopes the detector signals are gated off for a period of approximately three milliseconds following each burst of fast neutrons from the accelerator. Thus the pulse stabilization circuitry 34 located at the surface provides a gating signal to the time gate 36 approximately 4 milliseconds following the receipt of the calibration and stabilization pulse from the downhole pulser 23.

The voltage pulse output signals from the time gate 36 are supplied as input to a multichannel pulse height analyzer 37. Multichannel pulse height analyzer 37 separates the gamma ray voltage pulses on the basis of their height, which it will be recalled corresponds to the energy of the gamma rays impinging upon the crystal 26 in the downhole sonde 18.

Referring now to FIG. 2 the gamma ray pulses are separated into two regions or energy windows based on the height thereof. These two windows are illustrated in FIG. 2 and labelled "silicon window" and "oxygen window". The silicon activation gamma ray energy window encompasses gamma rays which fall in an energy range from approximately 0.5 mev to 2.0 mev. The oxygen activation gamma ray energy window extends from 2.0 mev to 7.25 mev. The oxygen activation gamma ray window includes gamma ray events such as the photopeak (6.13 mev), the two escape peaks from pair production, and some of the Compton scattering event gamma rays produced by Compton scattering of gamma rays in the crystal. The oxygen energy window is set this wide in order to increase the oxygen counting rate and thereby provide optimum counting statistics for the well log.

The silicon energy window encompasses the 1.78 mev aluminum 28 photopeak together with energy ranges corresponding to some of the Compton gamma ray scattering events in the crystal. However, the pair production escape peaks are not covered by the silicon energy window. Falling within the silicon energy window is some background gamma radiation produced from crystal activation by thermal neutrons and gamma rays which have been energy deteriorated by Compton scattering. The background from both of these sources may be corrected by using calibration information. The crystal activation background counting rate is determined by measuring the count rate in the silicon energy window with the well logging sonde 18 suspended in air after making a well logging run through a test bore hole. The background falling in the silicon energy window from deteriorated Compton scattered gamma rays due to the oxygen activation may be determined by measuring the count rate in the silicon window while the sonde is suspended in a pure limestone formation (i.e. containing no silicon). Under this condition the count rate measured in the formation is the sum due to crystal activation and oxygen activation deteriorated gamma ray background. By first determining the crystal activation background count rate as described, the oxygen background count rate can then be determined by subtracting the air count rate from the count rate in the pure limestone formation (in the silicon energy window).

This technique provides the two correction terms which are applied to the counts detected in the silicon energy window in the multichannel pulse height analyzer 37 by the background correction circuit 38 of FIG. 1. The background correction circuit 38 subtracts these two predetermined terms from the counts detected in the silicon energy window in the multichannel pulse height analyzer 37 and provided as input to it on input line 39. The output from the background correction circuit 38 is supplied as one input to a ratio circuit 40 and additionally as an input to the recorder 21 where it is plotted directly as a function of bore hole depth on the record medium 22 as previously discussed.

The oxygen activation gamma ray counts output from the multichannel pulse height analyzer 37 is supplied to the opposite input of the ratio circuit 40. The ratio circuit 40, in turn, produces an output signal which is the ratio of its two input signals (or silicon-/oxygen ratio) which is, as indicated in FIG. 1, supplied to the well logging recorder 21. Recorder 21 plots this ratio quantity as a function of bore hole depth in the manner previously described. Finally the oxygen counts are also supplied from the multichannel pulse height analyzer 37 to the well logging recorder 21 and plotted as a function of bore hole depth.

In conventional well logging operations the logging tool is typically lowered to the lowermost depth desired to be logged and then moved upwardly through the bore hole while performing the well logging operation. In the present invention it is then readily apparent that the distance between the source and detector and the speed at which the well logging tool is moved through the bore hole determine the time lag between the irradiation of a particular depth level in a formation with neutrons and the detection of the activation gamma rays subsequently occurring as measured by the gamma ray detector. Commercially, it is desirable to log as fast as possible in order to occupy less time on the well site. However, this must be compromised against the necessity for obtaining sufficient counting statistics to insure an accurate measurement.

While the well logging sonde 18 is provided with a layer of shielding material 41 between the pulsed neutron source 22 and the detector crystal 26 some direct neutron irradiation of the crystal 26 occurs and crystal activation takes place as the neutrons are not entirely stopped by the radiation shielding material 41. Accordingly, this factor must be taken into account in determining the optimum source to detector spacing to ensure a commercially feasible well logging speed without undue activation of the detector crystal which can raise the background radiation level to an undesirable amount.

Referring now to FIG. 5 a plot of counts of per second of crystal activation gamma rays versus source to detector spacing is illustrated. It will be observed that as the source to detector spacing is decreased from 25 to 20 inches that neutron activation of the detector crystal increases a rapid rate. Increasing the source to detector spacing from 25 to 30 inches does not noticeably decrease the crystal activation. By the use of this graphical representation and other experimental techniques it has been determined that in the case of the present invention an optimum source to detector spacing of approximately 25⅝ inches between centers produces satisfactory results with a commercially useable logging tool speed of approximately ten feet per minute.

Referring now to FIG. 4, a cross plot of the detected silicon energy window counting rate versus the oxygen energy window counting rates for earth formations having known water saturations ranging between 0 and 100 percent is illustrated. It will be observed that these data fall along a family of lines having a separation based on the oxygen content between the 0 percent water saturation and 100 percent water saturation lines. By use of a family of calibration curves such as that shown in FIG. 4 then, it is possible to determine the percent of water saturation of a given earth formation in the vicinity of a well bore hole by comparing the corrected silicon energy window and oxygen energy window count rates in the manner illustrated. If desired this comparison may be implemented on a small general purpose digital computer at the well site or it may be done at a remote site at a later time.

The sand content of a given formation, it has been determined, may be found by taking the ratio silicon-/oxygen counting rates in the manner illustrated in FIG. 1 and plotting this as a function of bore hole depth. This ratio has been found to be fairly independent of porosity but there is a large change in the ratio when the formation changes from sand (which contains a high percentage of silicon) to lime (which contains only a trace, if any) of silicon. Thus the silicon to oxygen ratio curve illustrated in FIG. 1 may be considered a lithology indicator and sandstone detector. The individual silicon and oxygen well logging curves may be utilized, for example by the use of techniques such as those discussed with respect to FIG. 4, in order to determine the water saturation of a depth zone of interest.

FIG. 6 illustrates a portion of a well logged in a field test with a well logging system in accordance with the concepts of the present invention. In this well the zone from 5320 feet to the bottom of the well was perforated and produced 325 barrels of pipe line oil per day. The well was later choked back to around 160 barrels per day. It will be noted in FIG. 6 that the relative silicon activation gamma ray counting rate and oxygen activation counting rate are both logged as a function of bore hole depth but the silicon over oxygen ratio is not recorded on this particular log. In the oil zone (5320 feet) it will be observed that there is a sharp decrease in the oxygen activation gamma ray counting rate while the silicon activation counting rate reamins relatively unchanged. This is an indication of sand formation having a hydrocarbon in the pore spaces between the sand grains as previously discussed.

The above description may make other alternative embodiments of the present invention apparent to those skilled in the art. For example, it may be possible to use other than a sodium iodide thallium activated crystal detector. It may be contemplated to add detectors or to use other neutron or gamma ray detectors known in the art. Other than a deuterium-tritiun accelerator pulsed neutron source could be used, provided that the source emitted neutrons having a sufficient energy to trigger the oxygen activation. Also slight variations on the placement of the energy windows and the time after neutron bursts of the detector activation could be made without departing from the true spirit of the invention.

Accordingly it is the aim in the appended claims to cover the invention so as to encompass all such changes and modifications which are rendered obvious to those

I claim:

1. A method for determining simultaneously the oxygen and silicon content of earth formations in the vicinity of a well borehole, comprising the steps of:

passing a pulsed source of fast neutrons through a well borehole and repetitively irradiating earth formations in the vicinity of the borehole with bursts of fast neutrons of energy sufficient to cause the nuclear reaction $O^{16}(N,P)N^{16}$;

detecting radiation occurring from the decay of unstable radioactive isotopes of elements in the vicinity of the borehole created by the capture of neutrons from said repetitive bursts of fast neutrons and generating voltage signals representative of the energy of said detected radiation;

separating, according to a predetermined energy relationship, said detected radiations into at least two energy components corresponding to the decay of radioactive isotopes produced by the capture of neutrons by the elements silicon and oxygen and making counts representative thereof;

correcting said representative counts of the radiation produced by the decay of unstable isotopes produced by the capture of neutrons by silicon for background radiation due to the degradation of gamma radiation produced by the decay of radioactive isotopes produced by the capture of neutrons by oxygen by Compton scattering of said gamma radiation; and recording said representative counts of radioactive isotopes produced by the capture of neutrons by silicon and oxygen as a function of borehole depth.

2. The method of claim 1 and further including the step of forming a ratio signal of said corrected representative counts of radiation produced by isotopes produced by the capture of neutrons by silicon and representative counts of radiation produced by isotopes produced by the capture of neutrons by oxygen and recording said ratio signal as a function of borehole depth.

3. The method of claim 1 wherein the step of separating said detected radiations into at least two energy components is performed by separating gamma radiation produced by the decay of unstable isotopes into an energy region extending from approximately 0.5 MEV to 2.0 MEV for silicon produced isotopes and from approximately 2.0 MEV to 7.25 MEV for oxygen produced isotopes.

4. The method of claim 1 wherein the steps of repetitively irradiating earth formations in the vicinity of a well borehole with fast neutrons is performed by repetitively irradiating said formations with bursts of approximately 14 MEV neutrons produced by a pulsed neutron source of the deuterium-tritium accelerator type.

5. The method of claim 1 wherein the step of repetitively irradiating earth formations in the vicinity of a well borehole with fast neutrons is performed by repetitively irradiating said formation with bursts of approximately 14 MEV neutrons of approximately 1 millisecond time duration.

6. The method of claim 5 wherein the step of detecting radiation occurring from the decay of unstable isotopes produced by the capture of neutrons from said repetitive irradiation bursts is performed by detecting gamma radiations so produced with a thallium activated sodium iodide crystal detector optically coupled to a photomultiplier tube.

7. The method of claim 6 wherein said detecting step is performed subsequent to each repetitive neutron burst of approximately 1 millisecond duration after the elapse of approximately a 3 millisecond time interval to allow the thermal neutron population from each neutron burst to substantially die away.

8. The method of claim 7 wherein said detecting step is performed subsequent to each repetitive neutron burst and after said elapsed interval by detecting gamma radiation resulting from the decay of unstable radioactive isotopes for a time interval of approximately 6 milliseconds.

9. A method of radioactivity well logging to locate potential oil producing zones of earth formations in the vicinity of a well borehole, comprising the steps of:

passing a pulsed source of fast neutrons through a well borehole and repetitively irradiating earth formations in the vicinity of the borehole with bursts of fast neutrons of energy sufficient to cause the nuclear reaction $O^{16}(N,P)N^{16}$;

delaying for a time sufficient to substantially allow the thermal neutron population in the borehole vicinity to substantially die away and then detecting gamma radiation produced by the decay of unstable radioactive isotopes produced by said neutron bombardment and generating voltage signals representative of the energy of gamma radiation produced by the decay of such unstable isotopes;

separating, according to a predetermined energy relationship, said detected gamma radiation into at least two energy components corresponding to the decay of radioactive isotopes produced by the capture of neutrons by silicon and oxygen and making counts representative thereof;

correcting the counts of said silicon produced gamma rays for background due to the Compton scattering of said oxygen produced gamma rays; and recording said corrected silicon and oxygen gamma ray count signals as a function of borehole depth.

10. The method of claim 9 and further including the step of forming a ratio signal of said corrected silicon counts and said oxygen counts and recording said ratio signal as a lithology indicator as a function of borehole depth.

11. The method of claim 9 wherein the step of separating said detected gamma radiation is performed by separating gamma radiation produced by the decay of unstable isotopes produced by the capture of neutrons by silicon in an energy region from approximately 0.5 MEV to 2.0 MEV and by the decay of unstable isotopes produced by the capture of neutrons by oxygen in an energy region from approximately 2.0 MEV to 7.25 MEV.

12. The method of claim 9 wherein the neutron bombardment step is performed by repetitively irradiating the earth formations in the vicinity of the borehole for a duration of approximately 1 millisecond with fast neutrons of approximately 14 MEV energy produced by a deuterium-tritium accelerator type neutron source.

13. The method of claim 12 wherein the detecting step is performed by delaying approximately 3 milliseconds after each neutron burst and then detecting gamma rays produced by the decay of unstable isotopes for an interval of approximately 6 milliseconds.

14. The method of claim 13 wherein a thallium activated sodium iodide scintillation crystal of generally cylindrical configuration and approximately 2 inch diameter and 4 inch length is used with a separation distance from its center to the center of the neutron source being approximately 25⅝ inches, and said crystal is optically coupled to a photomultiplier tube.

* * * * *